(12) United States Patent
Rodriguez et al.

(10) Patent No.: US 7,658,388 B1
(45) Date of Patent: Feb. 9, 2010

(54) CART APPARATUS

(76) Inventors: Ramona Rodriguez, 15227 Isleton Rd., Isleton, CA (US) 95641; Alex Rodriguez, 15227 Isleton Rd., Isleton, CA (US) 95641

( * ) Notice: Subject to any disclaimer, the term of this patent is extended or adjusted under 35 U.S.C. 154(b) by 4 days.

(21) Appl. No.: 12/211,717

(22) Filed: Sep. 16, 2008

(51) Int. Cl.
*B60N 2/28* (2006.01)

(52) U.S. Cl. .......... 280/30; 280/639; 280/646; 280/651; 108/131; 108/132; 108/133

(58) Field of Classification Search ............ 280/30, 280/47.131, 47.18, 638, 639, 645, 646, 651, 280/652; 108/115, 116, 117, 118, 119, 120, 108/121, 122, 123, 124, 125, 126, 127, 128, 108/129, 130, 131, 132, 133, 134, 135
See application file for complete search history.

(56) References Cited

U.S. PATENT DOCUMENTS

| | | | |
|---|---|---|---|
| D277,793 S | 2/1985 | Allen | |
| 4,765,644 A | 8/1988 | Bell | |
| 6,045,150 A | 4/2000 | Al-Toukhi | |
| 6,070,899 A | 6/2000 | Gines | |
| 7,036,833 B1 | 5/2006 | Berna et al. | |
| 2005/0140119 A1 | 6/2005 | Wong | |

*Primary Examiner*—Lesley Morris
*Assistant Examiner*—Brodie Follman
(74) *Attorney, Agent, or Firm*—Crossley Patent Law; Mark A. Crossley

(57) ABSTRACT

The wheeled cart apparatus provides transport of multiple items from a vehicle to a chosen destination. The apparatus features collapsible telescopic legs of which each has a swivel wheel with wheel lock. The upper borders surround substantially the entire rectangular table top. The lower skirts provide teeth for preventing movement of the apparatus when loaded into a vehicle. The grips on the first skirt provided for lifting that side of the apparatus while the casters on the opposite skirt enable ease of apparatus movement with the first skirt lifted. The lockably hinged legs are prevented escape from the collapsed position by the c-clips and the keeper rod. Legs are spaced inwardly from the skirts to aide in apparatus support while legs are extended or collapsed.

5 Claims, 5 Drawing Sheets

CART APPARATUS

BACKGROUND OF THE INVENTION

With the increased population of sport utility vehicles and minivans, vehicle users have found a need for transferring groceries and other items from the vehicle to a home. Repeated trips are typically necessary in doing so. Typical two-wheeled dollies are not suitable for such items, especially since stacking sacks and other items is both undesirable and often impossible. Various carts have been proposed, yet none offer the unique problem solving features of the present apparatus.

FIELD OF THE INVENTION

The wheeled cart apparatus relates to carts and more especially to a collapsible leg wheeled cart which is ideally used in conjunction with sport utility vehicles and minivans.

SUMMARY OF THE INVENTION

The general purpose of the wheeled cart apparatus, described subsequently in greater detail, is to provide a wheeled cart apparatus which has many novel features that result in an improved wheeled cart apparatus which is not anticipated, rendered obvious, suggested, or even implied by prior art, either alone or in combination thereof.

To attain this, the wheeled cart apparatus provides a plurality of features which enable convenience in use with such a vehicle as noted above. The collapsible legs are paired, providing stability and ease of collapse and extension. The legs are telescopically adjustable for greatest convenience in leg length. The legs are fitted with selectively lockable hinges so that the legs are selectively maintained in either the collapsed or extended position. The legs are further hindered in undesirable extension by the removable leg keeper rod and by the c-clips which removably fasten each leg to the table bottom. The legs are spaced away from each of the edges of the table by at least five inches so that the table can be supported on a vehicle bumper or other object prior to the legs being extended or collapsed. An omni directional swivel wheel fitted to each leg is fitted with a selective wheel lock to prevent rolling when undesired. A further advantage provided by the apparatus is the caster on each caster mount on the second skirt of the table. By lifting the apparatus by the grips on the first skirt, the casters positioned on the opposite skirt allow a user to easily roll the apparatus out of or into the vehicle.

A further advantage provided by the apparatus are the teeth disposed on the skirts of the table which project below the skirt bottoms. In the collapsed position, the legs are above the skirt bottoms of the table. The teeth provide grip on the interior surface of the vehicle, thereby preventing the apparatus from undesired movement within the vehicle during driving. The upper borders of the table provide for item retention, either during driving or during transport from the vehicle to a destination.

Thus has been broadly outlined the more important features of the improved wheeled cart apparatus so that the detailed description thereof that follows may be better understood and in order that the present contribution to the art may be better appreciated.

An object of the wheeled cart apparatus is to transport multiple items from a vehicle to a destination.

Another object of the wheeled cart apparatus is to provide selectively collapsible legs.

A further object of the wheeled cart apparatus is to provide for ease in loading and unloading the apparatus with regard to a vehicle.

An added object of the wheeled cart apparatus is to prevent apparatus movement within a vehicle during driving.

And, an object of the wheeled cart apparatus is to provide an adjustable height of the table.

Yet another object of the apparatus is to confine items to the table top via the upper borders.

And, another object of the apparatus is to provide for supporting a part of the apparatus on a given surface during collapse or extension of the legs.

These together with additional objects, features and advantages of the improved wheeled cart apparatus will be readily apparent to those of ordinary skill in the art upon reading the following detailed description of presently preferred, but nonetheless illustrative, embodiments of the improved wheeled cart apparatus when taken in conjunction with the accompanying drawings.

In this respect, before explaining the current embodiments of the improved wheeled cart apparatus in detail, it is to be understood that the wheeled cart apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved wheeled cart apparatus. It is therefore important that the claims be regarded as including such equivalent constructions insofar as they do not depart from the spirit and scope of the wheeled cart apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the wheeled cart apparatus generally designated by the reference number 10 will be described.

Figure 1:
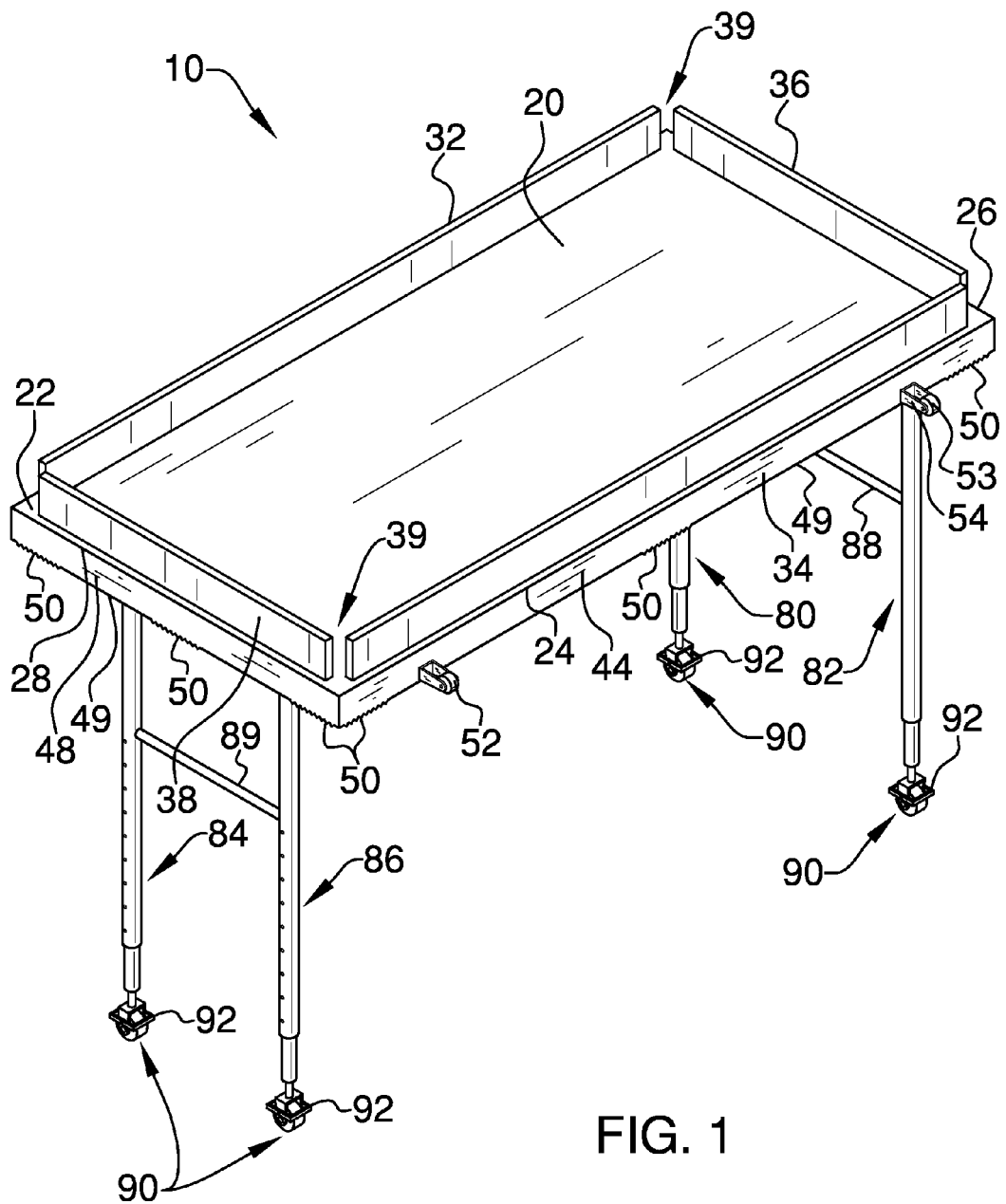
FIG. 1 is a top perspective view, legs extended.
Figure 2:
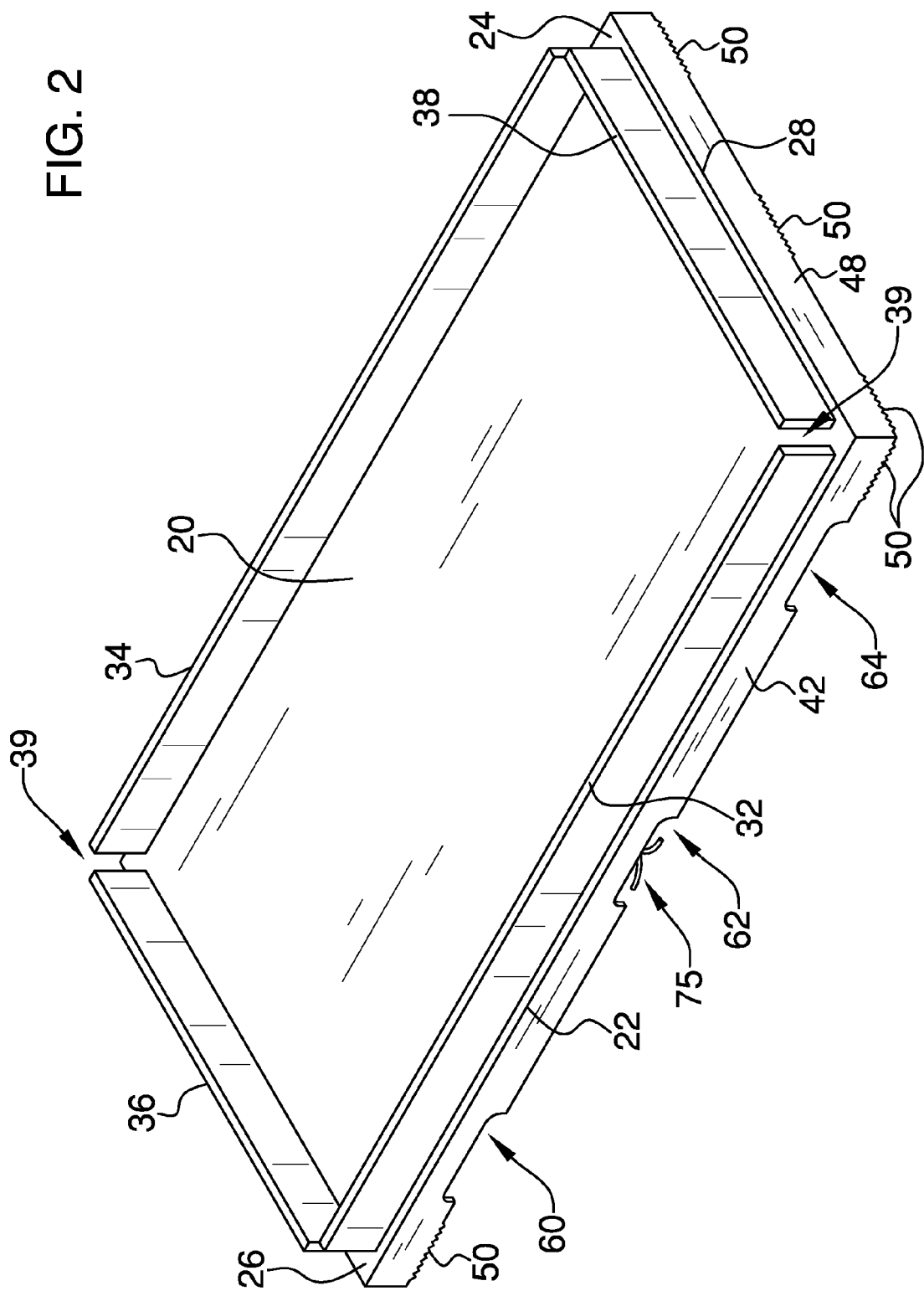
FIG. 2 is a top perspective view, legs collapsed.
Figure 3:
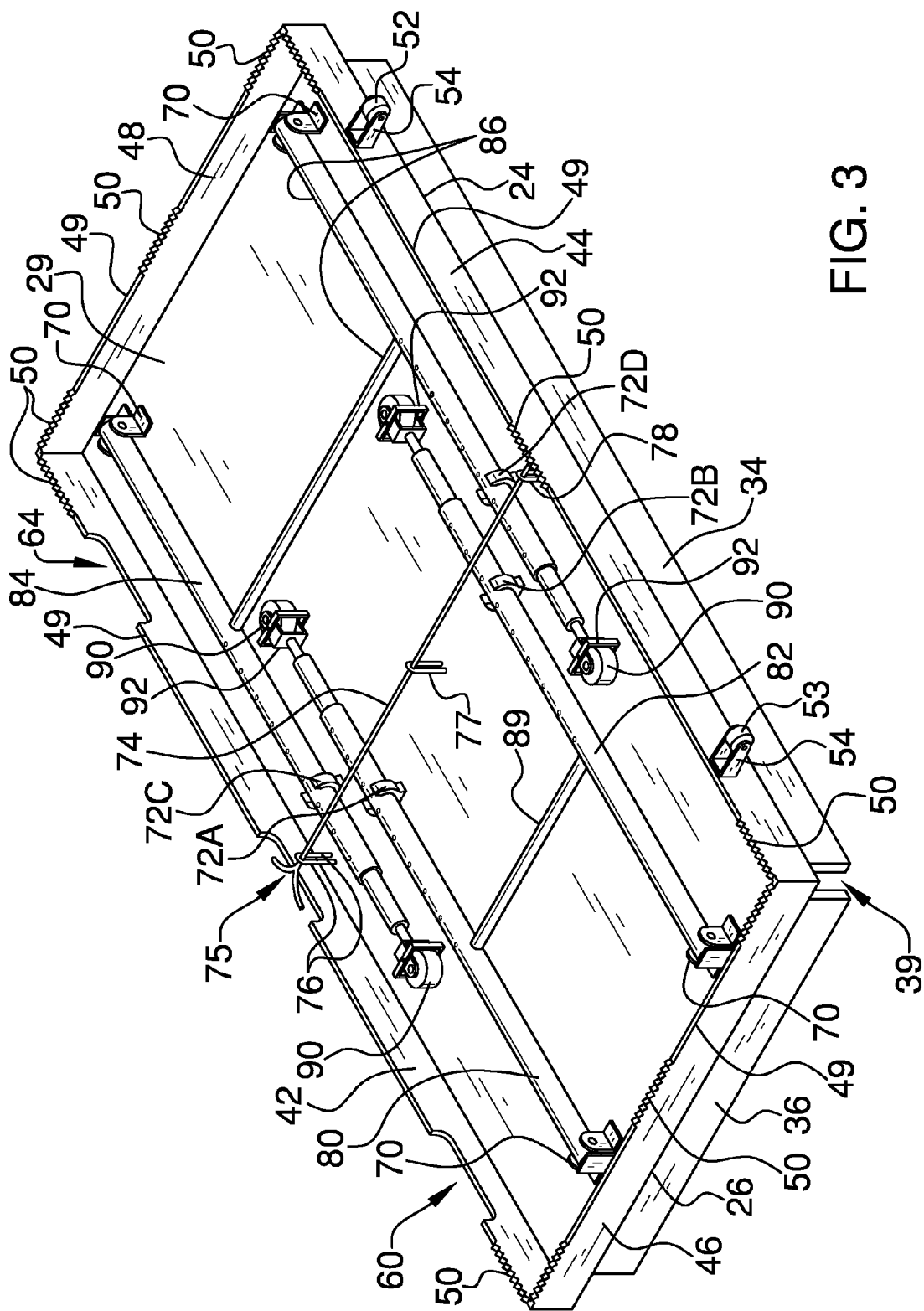
FIG. 3 is a bottom perspective view, legs collapsed.

Referring to FIGS. 1, 2, and 3, the wheeled cart apparatus 10 provides for removable sliding fit within a minivan, an SUV, or other such vehicle. Typically such vehicles have a rear cargo area, sometimes existing or created by seat removal or fold down, which can hold the apparatus 10 prior to selective removal. The apparatus 10 provides for a loading a plurality of items, such as grocery bags for example, onto the apparatus 10 for transport, thereby negating multiple trips which would otherwise be necessary. The apparatus comprises, in combination, the rectangular table 20 having a first edge 22 spaced apart from a second edge 24, and a third edge 26 spaced apart from a fourth edge 28.

The quartet of upper borders is disposed atop the table 20. The upper borders comprise a first upper border 32 proximal to the table 20 first edge 22. The second upper border 34 is proximal to the table 20 second edge 24. The third upper border 36 is proximal to the table 20 third edge 26. The fourth upper border 38 is proximal to the table 20 fourth edge 28. A gap 39 is disposed between the third upper border 36 and each of the first upper border 32 and second upper border 34. A gap 39 is disposed between the fourth upper border 38 and each of the first upper border 32 and second upper border 34. A quartet of spaced apart telescopic legs is affixed to a table 20 bottom 29. Each leg is affixed via a lockable hinge 70. The legs are spaced inwardly from the first skirt 42 and the second skirt 44 such that either skirt may be supported by a given surface and the legs thereby pivoted to the extended position, while the table 20 is partially supported. The legs comprise the first leg 80 which is coplanar with the second leg 82. The third leg 84 is coplanar with the fourth leg 86. Each leg is selectively moved from a collapsed position parallel with the table 20 bottom 29 to an extended position perpendicular to the table 20 bottom 29. The first leg brace 88 connects the first leg 80 to the second leg 82. The second leg brace 89 connects the third leg 84 to the fourth leg 86. A swivel wheel 90 is disposed on the bottom of each leg. A wheel lock 92 selectively locks each wheel 90.

Figure 4:
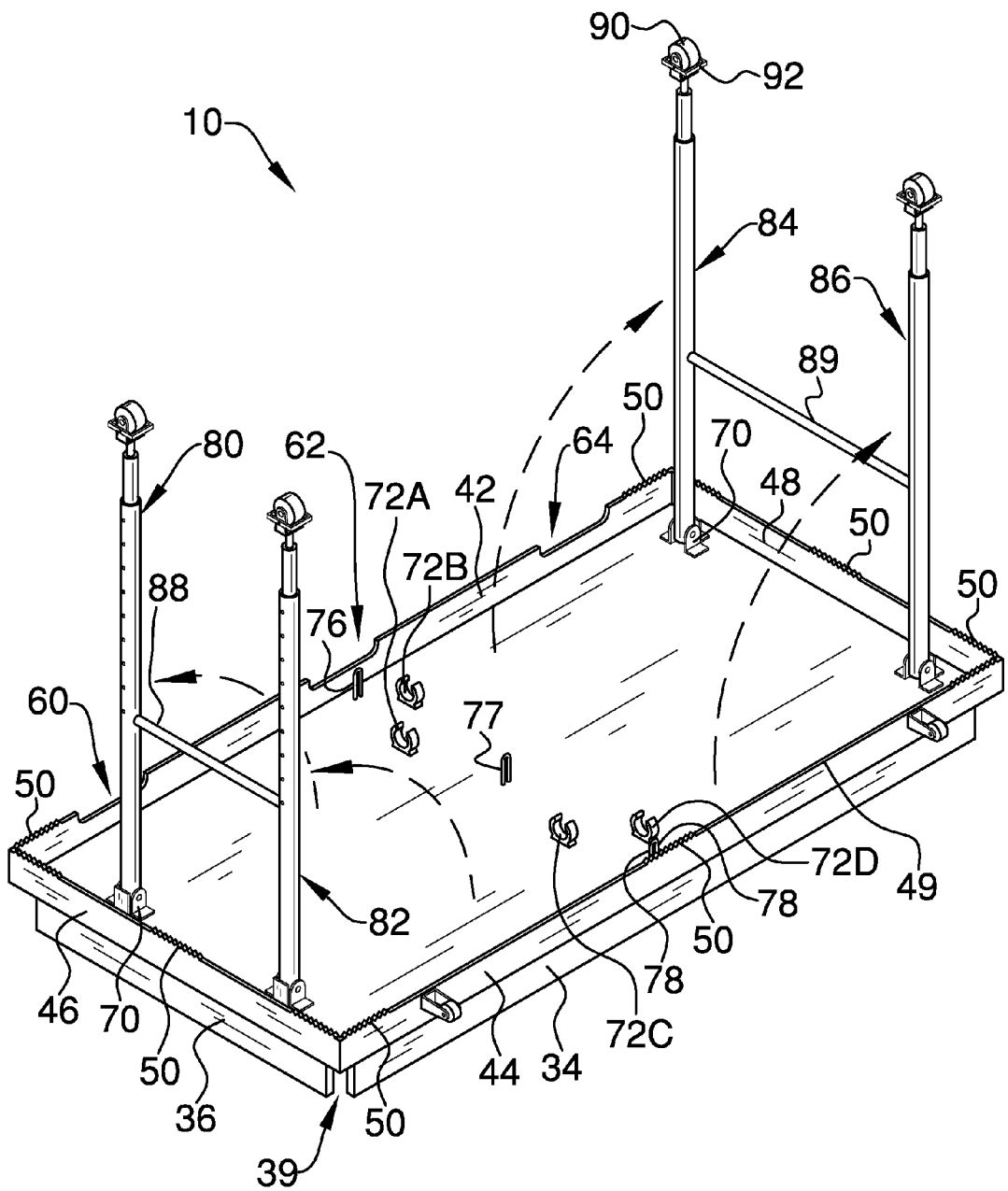
FIG. 4 is a bottom perspective view, legs extended.

Referring to FIGS. 3 and 4, the quartet of lower skirts is disposed downwardly from the table 20 bottom 29. The lower skirts are comprised of the first skirt 42 disposed below the first edge 22 of the table 20. The second skirt 44 is disposed below the second edge 24.

The third skirt 46 is disposed below the third edge 26. The fourth skirt 48 is disposed below the fourth edge 28. Each skirt has a skirt bottom 49b. The plurality of spaced apart grips is disposed within the first skirt 42. The grips comprise the first grip 60 most proximal to the third skirt 46. The second grip 62 is in an approximate center of the first skirt 42. The third grip 64 is most proximal to the fourth skirt 48. A plurality of spaced apart teeth 50 is disposed within skirt bottom 49b of each skirt. The teeth 50 are projected below the skirt bottoms 49b. The plurality of spaced apart c-clips is partially comprised of the first c-clip 72a to which the first leg 80 is selectively secured. The second c-clip 72b selectively secures the second leg 82. The third c-clip 72c selectively secures the third leg 84. The fourth c-clip 72d selectively secures the fourth leg 86. The plurality of spaced apart rod holders removably holds the keeper rod 74 with handle 75. The holders comprise the first rod holder 76, the second rod holder 77, and the third rod holder 78. Each rod holder is affixed to the bottom 29 of the table 20.

Figure 5:
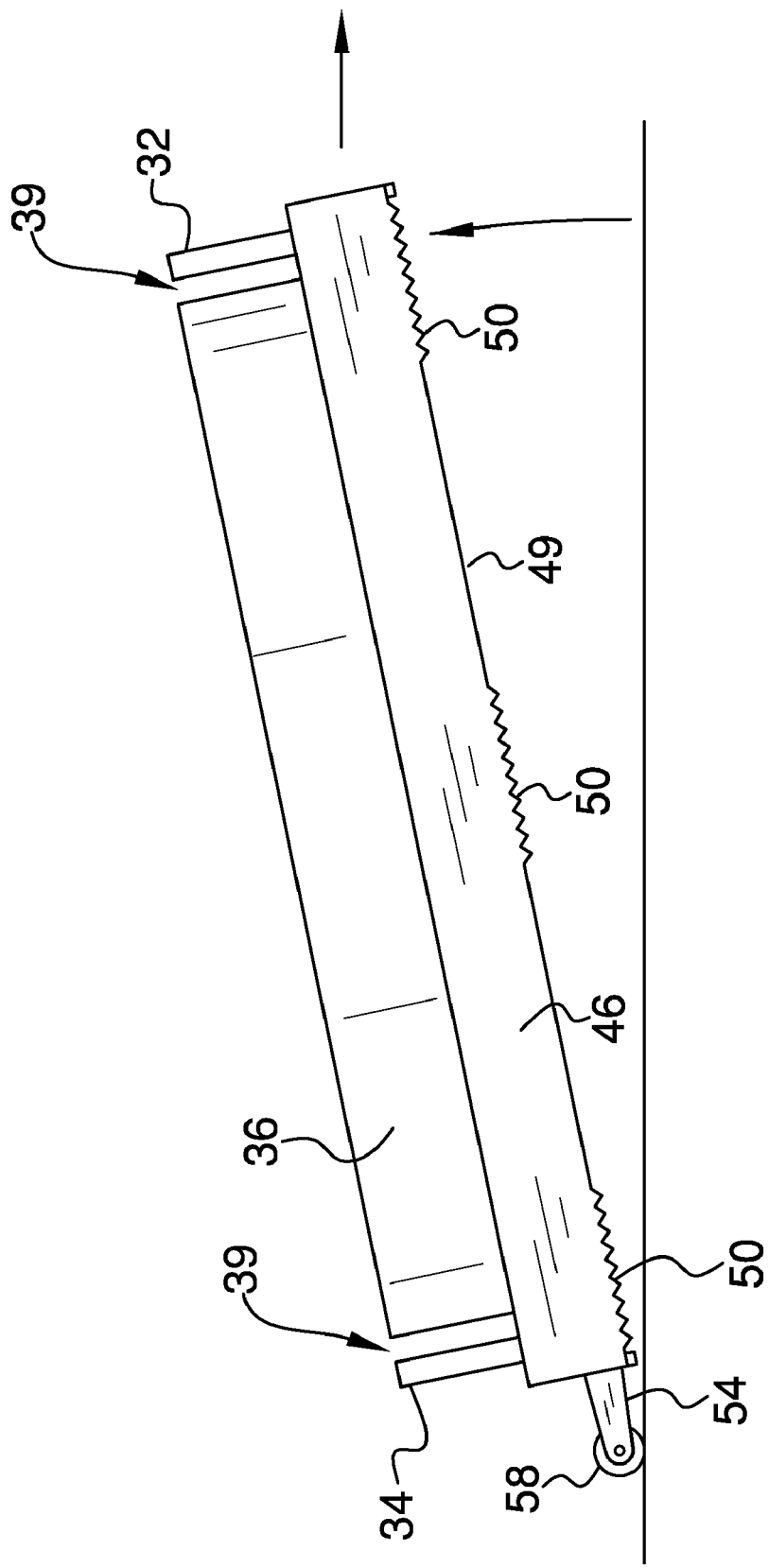
FIG. 5 is a side elevation view, legs collapsed and table tilted toward the casters.

Referring to FIG. 5, the pair of spaced apart casters comprises the first caster 52 and the second caster 53. Each caster is affixed to the second skirt 44, each via an identical caster mount 53. Each caster is horizontally even with the skirt bottom 49b of the second skirt 44.

With respect to the above description then, it is to be realized that the optimum dimensional relationships for the parts of the wheeled cart apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the wheeled cart apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the wheeled cart apparatus may be used.

Therefore, the foregoing is considered as illustrative only of the principles of the wheeled cart apparatus. Further, since numerous modifications and changes will readily occur to those skilled in the art, it is not desired to limit the wheeled cart apparatus to the exact construction and operation shown and described, and accordingly, all suitable modifications and equivalents may be resorted to, falling within the scope of the wheeled cart apparatus.

What is claimed is:

1. A wheeled cart apparatus, comprising, in combination:
    a rectangular table having a first edge spaced apart from a second edge, a third edge spaced apart from a fourth edge, and a bottom;
    a quartet of upper borders disposed atop the table, the upper borders comprised of a first upper border proximal to the table first edge, a second upper border proximal to the table second edge, a third upper border proximal to the table third edge, a fourth upper border proximal to the table fourth edge; a gap between the third upper border and the first and second upper borders, a gap between the fourth upper border and the first and second upper borders;
    a quartet of spaced apart telescopic legs affixed to a table bottom, each leg affixed via a selectively lockable hinge, the legs comprising a first leg coplanar with a second leg, a third leg coplanar with a fourth leg, each leg selectively moved from a collapsed position parallel with the table bottom to an extended position perpendicular to the table bottom;
    a first leg brace connecting the first leg to the second leg;
    a second leg brace connecting the third leg to the fourth leg;
    a swivel wheel on a bottom of each leg;
    a wheel lock selectively locking each wheel;
    a quartet of lower skirts disposed downwardly from the table bottom, the lower skirts comprised of a first skirt below the first edge, a second skirt below the second edge; a third skirt below the third edge, and a fourth skirt below the fourth edge, each skirt having a skirt bottom, the legs above the skirt bottoms when in a collapsed position, each leg disposed at least five inches inwardly from any of the table edges;
    a plurality of spaced apart teeth disposed within skirt bottom of each skirt;
    a plurality of identical spaced apart c-clips disposed on the table bottom, each c-clip in removable receipt of one of the leg in the collapsed position;
    a keeper rod selectively positioned below the collapsed positioned legs;
    a plurality of spaced apart rod holders removably holding the keeper rod, the holders comprising a first rod holder, a second rod holder, and a third rod holder, each rod holder affixed to the bottom of the table.

2. The apparatus according to claim 1 wherein the teeth are further projected below the skirt bottoms.

3. A wheeled cart apparatus, comprising, in combination:
    a rectangular table having a first edge spaced apart from a second edge, a third edge spaced apart from a fourth edge, and a bottom;
    a quartet of upper borders disposed atop the table, the upper borders comprised of a first upper border proximal to the table first edge, a second upper border proximal to the table second edge, a third upper border proximal to the table third edge, a fourth upper border proximal to the table fourth edge; a gap between the third upper border and the first and second upper borders, a gap between the fourth upper border and the first and second upper borders;

a quartet of spaced apart telescopic legs affixed to a table bottom, each leg affixed via a selectively lockable hinge, the legs comprising a first leg coplanar with a second leg, a third leg coplanar with a fourth leg, each leg selectively moved from a collapsed position parallel with the table bottom to an extended position perpendicular to the table bottom;

a first leg brace connecting the first leg to the second leg;

a second leg brace connecting the third leg to the fourth leg;

a swivel wheel on a bottom of each leg;

a wheel lock selectively locking each wheel;

a quartet of lower skirts disposed downwardly from the table bottom, the lower skirts comprised of a first skirt below the first edge, a second skirt below the second edge; a third skirt below the third edge, and a fourth skirt below the fourth edge, each skirt having a skirt bottom, the legs above the skirt bottoms when in a collapsed position;

a plurality of spaced apart grips disposed within the first skirt, comprising a first grip, a second grip, and a third grip;

a plurality of spaced apart teeth disposed within skirt bottom of each skirt, the teeth extended below the skirt bottoms;

a keeper rod selectively positioned below the collapsed positioned legs;

a plurality of spaced apart rod holders removably holding the keeper rod, the holders comprising a first rod holder, a second rod holder, and a third rod holder, each rod holder affixed to the bottom of the table.

4. The apparatus according to claim 3 wherein the teeth are further projected below the skirt bottoms.

5. A wheeled cart apparatus, comprising, in combination:

a rectangular table having a first edge spaced apart from a second edge, a third edge spaced apart from a fourth edge, and a bottom;

a quartet of upper borders disposed atop the table, the upper borders comprised of a first upper border proximal to the table first edge, a second upper border proximal to the table second edge, a third upper border proximal to the table third edge, a fourth upper border proximal to the table fourth edge; a gap between the third upper border and the first and second upper borders, a gap between the fourth upper border and the first and second upper borders;

a quartet of spaced apart telescopic legs affixed to a table bottom, each leg affixed via a selectively lockable hinge, the legs comprising a first leg coplanar with a second leg, a third leg coplanar with a fourth leg, each leg selectively moved from a collapsed position parallel with the table bottom to an extended position perpendicular to the table bottom;

a first leg brace connecting the first leg to the second leg;

a second leg brace connecting the third leg to the fourth leg;

a swivel wheel on a bottom of each leg;

a wheel lock selectively locking each wheel;

a quartet of lower skirts disposed downwardly from the table bottom, the lower skirts comprised of a first skirt below the first edge, a second skirt below the second edge; a third skirt below the third edge, and a fourth skirt below the fourth edge, each skirt having a skirt bottom, the legs above the skirt bottoms when in a collapsed position;

a plurality of spaced apart grips disposed within the first skirt, comprising a first grip, a second grip, and a third grip;

a plurality of spaced apart teeth disposed within skirt bottom of each skirt, the teeth projected below the skirt bottoms;

a pair of spaced apart casters affixed to the second skirt, each caster affixed perpendicularly via a caster mount, each caster horizontally even with the second skirt bottom;

a keeper rod selectively positioned below the collapsed positioned legs;

a plurality of spaced apart rod holders removably holding the keeper rod, the holders comprising a first rod holder, a second rod holder, and a third rod holder, each rod holder affixed to the bottom of the table.

* * * * *